April 4, 1961  O. MALFELD  2,977,848
DEVICE FOR SIMULTANEOUSLY EXCHANGING OPTICAL SYSTEMS
Filed Oct. 2, 1959  2 Sheets-Sheet 1
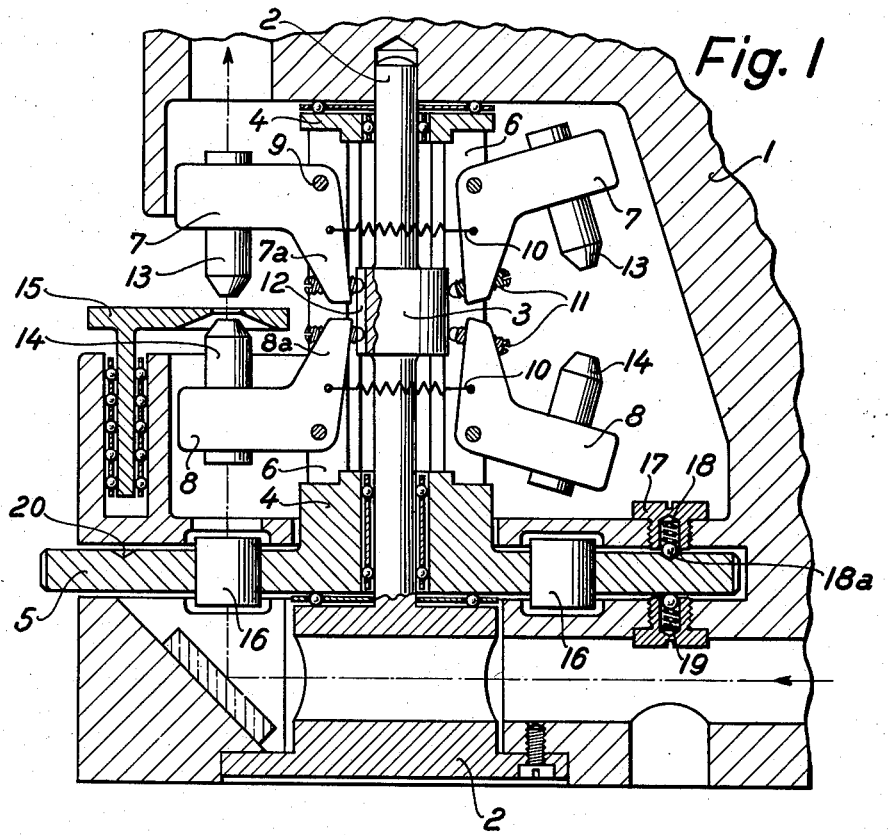
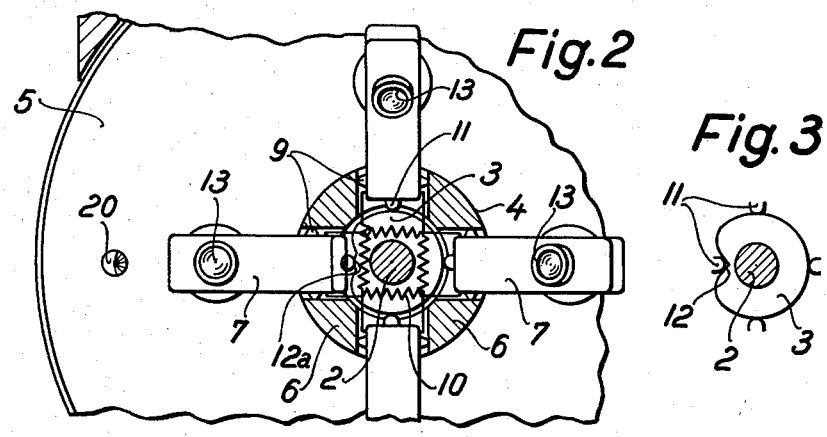
INVENTOR
OTTO MALFELD
BY Toulmin & Toulmin
ATTORNEYS April 4, 1961 O. MALFELD 2,977,848
DEVICE FOR SIMULTANEOUSLY EXCHANGING OPTICAL SYSTEMS
Filed Oct. 2, 1959 2 Sheets-Sheet 2

INVENTOR
OTTO MALFELD
BY Toulmin & Toulmin
ATTORNEYS

United States Patent Office 2,977,848
Patented Apr. 4, 1961

2,977,848
DEVICE FOR SIMULTANEOUSLY EXCHANGING OPTICAL SYSTEMS

Otto Malfeld, Wetzlar (Lahn), Germany, assignor to Ernst Leitz Gesellschaft mit beschrankter Haftung, Wetzlar (Lahn), Germany Filed Oct. 2, 1959, Ser. No. 844,014

Claims priority, application Germany Oct. 3, 1958

4 Claims. (Cl. 88—39)

The present invention relates to a device for simultaneously exchanging optical systems. More in particular the present invention relates to a device for simultaneously exchanging optical systems comprising at least two optical members particularly for use with microscopes.

It is known that in microscopes having a plurality of exchangeable objectives the illuminating means, such as for example the condenser means must be adapted to the particular objective in operative position. If another objective is brought into the operative position, then the condenser with the corresponding aperture must also be exchanged. This is in some instances difficult, since particularly in case of objective systems of great magnifying power the front lens is positioned very close to the object and must be removed therefrom prior to exchanging the objective. In the known microscopes the exchange is very complicated and requires at least four different operations. First, the tube must be lifted or the objective table must be lowered, then the desired objective must be brought in the optical axis of observation, thereafter the objective must be lowered or the objective table must be lifted, and finally the condenser must be exchanged. It will be easily recognized that this exchange is very complicated and time-consuming, particularly in view of the fact that at least four different operations are required.

It has already been proposed to facilitate the exchange by providing a device wherein two revolving holders for the objective and the condenser are oppositely positioned relative to each other, and are inclined with respect to the optical axis. In order to effect an exchange the two revolving holders are rotated away from the object, then are rotated and finally lowered back to the object. This arrangement requires, however, a plurality of complicated transmission means which must be very accurately produced and carefully adjusted and hence render the entire arrangement extremely expensive. In addition, it is not susceptible to effect the simultaneous exchange of an additional optical member such as, for example, a further condenser member, a diaphragm, or a light source as used, for example, in interference microscopes.

It has also already become known to provide means for simultaneously exchanging the objectives and condensers in a microscope wherein the objectives and condensers are mounted on rotors and can be turned about axes which are disposed parallel to each other which rotors are connected by synchronous coupling means. However, the transmission of movement to the objectives and condensers is effected by means forming the segment of a circle which results in an unfavorable transmission ratio so that the optical members are but very slowly removed from the object.

It is also known to provide a fast operating exchanging device for the objectives and condensers in micro-projectors and wherein the objectives and condensers are mounted on a common shaft which latter is rotatably positioned on a support. This makes it possible to very quickly move into or remove from the optical axis the desired objectives or condensers. It is, however, not possible to displace the objectives and condensers relative to one another and to increase, within the optical axis of observation, the distance of objective and condenser from the object.

With the foregoing in mind it is the object of the present invention to provide a device for simultaneously exchanging optical systems comprising at least two optical members particularly for use in microscopes, with which the simultaneous exchange of all members of the optical system for another optical system can be effected in one operation, very speedily and conveniently and with the addition of transmission means which are comparatively simple and inexpensive and can be produced with comparatively great tolerances, and which makes it possible to not only displace the optical system with respect to the optical axis of observation but also and simultaneously therewith displace the optical members of the system with respect to each other so as to lower or lift them, respectively, in regard to the object.

These objects are achieved by the device for simultaneously exchanging optical systems comprising at least two optical members of the present invention. It comprises a shaft bearing a rotor on which latter there are mounted a plurality of optical systems such as for example pairs comprising an objective and a condenser and comprising control means for removing one pair and bringing into the operating position the desired pair of objective/condenser. According to the invention, the control means comprise a curved control member consisting of a cylinder having a heart-indent shaped recess.

According to another embodiment of the invention the pointed portion of the heart-indent shaped recess is replaced by a cylinder-shaped portion coaxially disposed with respect to the axis of rotation of the shaft on which the control member is mounted.

According to another, preferred embodiment of the invention the optical system comprises at least three separate members such as, for example, a third member an auxiliary condenser, which latter is mounted on a rotary disk portion of the rotor, and is removed from and brought into the operating position simultaneously with the other two members of the optical system.

The invention will be more fully understood upon the following detailed description of the accompanying drawings, wherein, Figure 1 is a side elevational view, partly in section, of the device of the present invention as used in a conventional microscope;

Figure 2 is a top view, partly in section, of the objective holders positioned on the control member and between the bars connecting the upper and the lower portion of the rotor;

Figure 3 is a top view, partly in section, of a curved control member having a heart-indent shaped pointed recess and mounted on a shaft;

Figure 4:
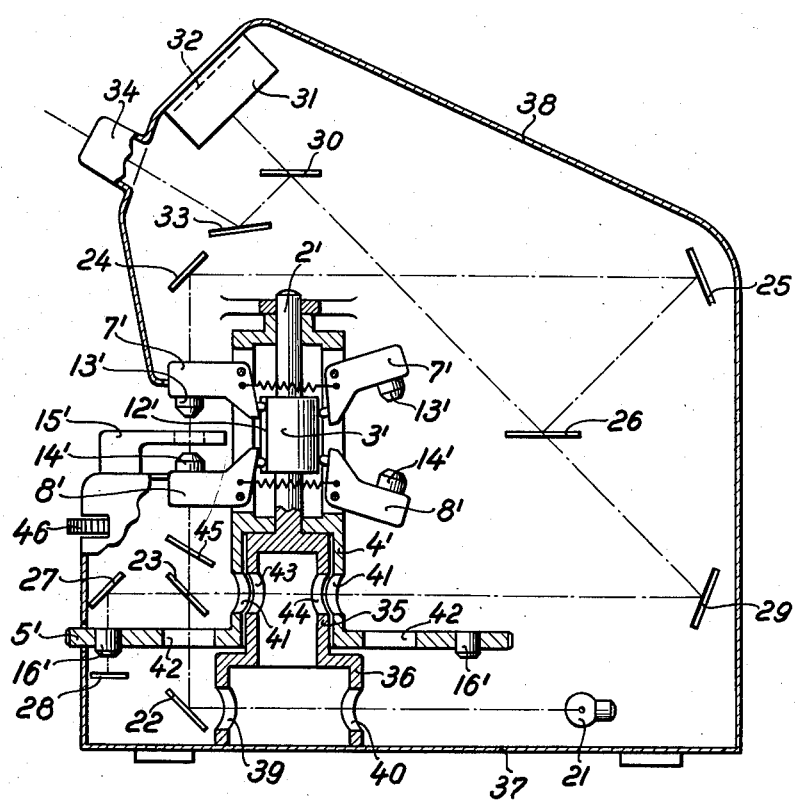
Figure 4 is a side elevational view, partly in section, of the device of the present invention, as used in an interference microscope.

Referring now to the drawings more in detail, a shaft 2 is fixedly connected with the casing 1 of the microscope. The shaft 2 is provided with a curved control member 3 consisting of a curved cylinder having a heart-indent shaped recess. A rotor 4 is rotatably positioned about shaft 2. The rotor 4 has a lower portion forming a rotary disc 5 and its upper and lower portions are connected by a plurality of bar portions 6. Between every two of these bar portions there are disposed an objective holder 7 and a condenser holder 8, supporting an objective 13 and a condenser 14, respectively. It is possible to provide, for example, four of such pairs of condensers and objectives. The objective holder 7 and the condenser holder 8 are rotatably positioned on bolts 9 and have a flange portion 7a and 8a bearing adjustable feeler bolts 11 and springs 10. The springs 10 attract each oppositely disposed pair of objective holders and each oppositely disposed pair of condenser holders as far as possible in view of the adjustable feeler bolts 11 coming to rest against the periphery of the curved control member 3. With each pair of condensers and objectives there is associated a second condenser member 16 disposed coaxially with respect to the optical axis of condesner 14 and objective 13.

The curved control member 3 is so positioned on shaft 2, that the heart-indent shaped recess 12 is directed towards the optical axis of observation. Thereby, that pair of the oppositely disposed objective holders and condenser holders which is located in the optical axis of observation engages the heart-indent shaped recess 12 with the respective adjustable feeler bolts 11. In this position the objective 13 and the condenser 14, as well as the further condenser member 16 and the rotary disc 5 of rotor 4, are in the operating position above and below the objective table 15, respectively.

The heart-indent shaped recess 12 of the curved control member 3 can be provided with a cylinder-shaped portion 12a which is coaxial with respect to the axis of rotation of shaft 2 as shown, for example, in Figure 2. This has the advantage that the lever action of the curved control member is increased as compared with the curved control member shown in Figure 3 having a pointed recess 12, since the distance between the portion of the recess which is in contact with the feeler members 11 and the axis of rotation is increased. However, if the curved control member is shaped as shown in Figure 2, the operating position must be secured by arresting means such as arresting means 17. They comprise screw means 17, spring 18 and a ball 18a pressed into a recess 20 provided on the upper surface of rotary disc 5. One of such recesses 20 is associated with each optical system. If there are, for example, provided 4 pairs of objectives and condensers there are also provided 4 recesses. In order to prevent any moment of instability the arresting means are equipped with additional pressure balancing means which can consist, for example, of screw, spring and ball means 19, disposed opposite to the arresting means, in cooperation with a recess in the rotary disc 5.

Separate arresting means as aforedescribed can be dispensed with if the heart-indent shaped recess 12 has a pointed configuration as shown in Figure 3.

The afore-described embodiment of the device for simultaneously exchanging optical systems such as pairs of condensers and objectives operates in the following manner:

If the rotary disc 5, a segment of which projects from casing 1 is turned, then the objective 13 and the condenser 14 are displaced in the corresponding sense of rotation. Simultaneously therewith the objective 13 and the condenser 14 each are moved away from the objective table 15. This latter movement is effected by the curved control member 3 whose movement is transmitted to the objective and condenser holders 7 and 8 via the feeler members 11. Also simultaneously therewith the additional condenser member 16 is horizontally displaced in the corresponding sense of rotation of rotary disc 5. The rotary disc 5 is turned until the desired objective with its corresponding condenser and the associated additional condenser member have been moved into the operating position. After having been displaced in the sense of rotation of rotary disc 5, all other members of the further optical systems which are not needed for the respective observation have disappeared in the interior of casing 1. After the observation with a particular optical system has been compelted the rotary disc 5 is turned again until the desired optical system has been brought into the operating position and so forth.

The device for simultaneously exchanging a plurality of optical systems can, for example, be also advantageously used in a interference microscope. This is shown by way of an example in Figure 4.

A light source 21 emits light rays which are deviated by mirror 22 to the semi-transmitting specular beam splitter 23. The light rays pass through the beam splitter 23 and then through one of the pairs of objectives and condensers 13', 14'. The mirrors 24 and 25 reflect the light rays to the semi-transmitting specular beam collector 26. The light rays reflected at the beam splitter 23 pass via the mirror 27 through one of the objectives 16' whose properties correspond to the adjusted objective condenser pairs 13', 14'. They then pass to the reference surface 28 where they are reflected and pass through the objective 16' and via the mirror 27 back to the beam splitter 23. The light rays passing through the beam spliter 23 pass via mirror 29 to the beam collector 26 where they interfere with the light rays reflected by mirror 25. The light rays passing through the beam splitter 30 produce an interference image on the photographic material in the camera 31. The reflected light rays are passed into the eye piece 34 via mirror 33.

Turning now to the device used in the aforedescribed interference microscope, it has again a shaft 2' which is enlarged at its lower end to form a first hollow cylinder 35 and a second still further enlarged hollow cylinder 36. The curved control member 3' with the heart indent shaped recess 12' is mounted on the shaft 2' substantially in the central portion thereof. The hollow cylinder 36 is fixedly connected with the base plate 37 of microscope casing 38 and has openings 39 and 40. The rotor 4' supports the objective holders 7' with the objectives 13' and the condenser holders 8' with the condensers 14'. The lower end of the rotor 4' surrounds the hollow cylinder 35 like a sleeve; it is connected with the rotary disk 5', and has openings 41 associated with the objective/condenser pairs 13', 14'. The rotary disk 5' supports the objectives 16' and also has openings 42 associated with the objective/condenser pairs 13', 14'.

The openings 43 and 44 in the hollow cylinder 35 are in congruent position with the opening 41 whenever the optical system comprising 3 members such as the objectives 16' and 13' and the condensers 14' is in the operating position.

The exchanging device operates in the same manner as described with reference to Figures 1 and 2. The objective table 15' can be displaced by knurl screw 46. It will also be of advantage to provide for adjusting purposes a plane parallel plate 45 between the beam splitter 23 and the condenser 14' in the operating position.

It will be understood that this invention is susceptible to modification in order to adapt it to different usages and conditions and, accordingly, it is desired to comprehend such modifications within this invention as may fall within the scope of the appended claims.

What I claim is:

1. A device for exchanging an optical system arranged in paired relation for another optical system arranged in paired relation, comprising, in combination, a rotatable shaft, a rotor on said shaft, said rotor having an upper portion, a manually movable rotary disk and a plurality of bars interconnecting said upper portion and said rotary disk, a first optical member of one optical system, an angle-shaped holder pivotally journalled between two of said bars and encompassing said first optical member at one end thereof, a second optical member of said same optical system arranged below said first member, another angle-shaped holder pivotally journalled between two of said bars and encompassing said second optical member at one end thereof, and a curved control member on said shaft for bringing said optical members into coaxial operating position, said curved control member having the form of a disk with a heart-indent shaped recess for engagement with the holders of said first and second optical members, said holders being spring-urged against said curved control member.

2. A device as described in claim 1 further comprising a third optical member of said same optical system mounted on said rotary disk of said rotor below said second optical member on the optical axis of said optical system.

3. A device as described in claim 1, wherein said control member having the form of a disk with a heart-indent shaped recess has in the bottom of the recess a cylinder-shaped portion being concentrical with the axis of rotation of said shaft, and arresting means for arresting said rotor in the operating position of said optical members.

4. A device for exchanging an optical system having an objective and a condenser arranged in paired relation for another optical system having an objective and a condenser arranged in paired relation while increasing the distance between each of said pairs, comprising, in combination, a shaft, a rotor on said shaft, said rotor having an upper portion, a manually movable rotary disk and a plurality of bars interconnecting said upper portion and said rotory disk, an objective of one optical system, a first holder for said objective, said holder being pivotally journalled between two of said bars, a condenser of one optical system, a second holder for said condenser, said holder being pivotally journalled between two of said bars below said first holder, a first and a second adjustable feeler pin mounted on said first and second holder, respectively, a curved control member on said shaft having the form of a disk with a heart-indent shaped recess, and spring means connected to said holders for urging said holders against said curved control member, thereby causing said feeler pins to engage said curved control member and allowing said pins to drop into said recess whereby said holders for said objective and condenser are aligned in operating position.

References Cited in the file of this patent
UNITED STATES PATENTS
2,264,835   Flint _____ Dec. 2, 1941